United States Patent [19]
Ubukata et al.

[11] Patent Number: 5,359,366
[45] Date of Patent: Oct. 25, 1994

[54] TIME BASE CORRECTION APPARATUS

[75] Inventors: Tsuneo Ubukata, Yokohama; Hiroshi Takeshita, Ebina, both of Japan

[73] Assignee: Victor Company of Japan, Ltd., Yokohama, Japan

[21] Appl. No.: 996,597

[22] Filed: Dec. 24, 1992

[30] Foreign Application Priority Data

Dec. 27, 1991 [JP] Japan .................................. 3-360513

[51] Int. Cl.5 .............................................. H04N 5/12
[52] U.S. Cl. .................... 348/536; 348/537; 348/512
[58] Field of Search ...................... 358/19, 17, 18, 320, 358/324, 325, 326, 148, 149, 158, 159, 337, 150, 339; 348/536, 537, 538, 539, 540, 541, 542, 543, 544, 545, 546, 505, 512, 513, 514; H04N 9/45, 9/47, 7/00, 5/73

[56] References Cited

U.S. PATENT DOCUMENTS

| | | | |
|---|---|---|---|
| 4,069,499 | 1/1978 | Ninomiya | 358/19 |
| 4,110,785 | 8/1978 | Dischert et al. | 358/19 |
| 4,673,980 | 6/1987 | Murakami et al. | 358/19 |
| 4,714,954 | 12/1987 | Yoshinaka et al. | 358/19 |
| 4,729,013 | 3/1988 | Tatami et al. | 358/19 |
| 4,772,950 | 9/1988 | Furuhata et al. | 358/158 |
| 4,987,491 | 1/1991 | Kaote et al. | 358/324 |
| 5,072,315 | 12/1991 | Tsunashima | 360/36.2 |

FOREIGN PATENT DOCUMENTS

| | | |
|---|---|---|
| 0417328 | 3/1991 | European Pat. Off. . |
| 0421486 | 4/1991 | European Pat. Off. . |
| 0449501 | 10/1991 | European Pat. Off. . |
| 0453285 | 10/1991 | European Pat. Off. . |
| 4-44484(A) | 2/1992 | Japan . |
| 4-46480(A) | 2/1992 | Japan . |

OTHER PUBLICATIONS

Patent Abstracts of Japan, vol. 8, No. 80 (M-189) (1517), Apr. 12, 1984.

Primary Examiner—James J. Groody
Assistant Examiner—Michael H. Lee
Attorney, Agent, or Firm—Jacobson, Price, Holman & Stern

[57] ABSTRACT

An apparatus for compensating a time base error of a video signal. A reference signal of no time base error is generated. A difference between a frequency of the reference signal and a frequency of a horizontal synchronizing signal included in an input analog video signal is detected and then a difference signal is outputted. In response to the difference signal, a phase of the reference signal is controlled. The video signal is sampled, based on the reference signal the phase of which is controlled, thus the video signal is converted into a digital signal in which the difference is cancelled. The digital signal is stored in a memory. And the stored digital signal is read out, based on the reference signal.

3 Claims, 7 Drawing Sheets

TIME BASE CORRECTION APPARATUS

BACKGROUND OF THE INVENTION

This invention relates to a time base correction apparatus which compensates time axis fluctuations of a video signal.

When a reproduced video signal has a time base error, this error can be compensated by digitalizing the video signal by means of a clock signal having the same time base error and writing the digitalized results in a memory, and reading out the signal by means of a clock signal having no time base error.

FIG. 1 shows an example of conventional time base correction apparatus. A video signal reproduced by a video tape recorder etc., is converted into a digital signal by an A/D converter 11 on the basis of a write clock signal which follows up the time base fluctuations and then stored in a memory 12. Then, based on a read clock signal having no time base fluctuation the digital signal is read out of the memory 12 and, after that, converted into an analog signal by a D/A converter 13 so that the video signal, whose time base error is compensated, can be output.

The write clock signal which follows up time base fluctuations can be generated as follows: A synchronizing separation circuit 14 separates a horizontal synchronizing signal from the reproduced video signal and sends it into a phase locked loop circuit (PLL) 15. The PLL 15 comprises a phase comparator 16, a low pass filter (LPF) 17, a voltage controlled oscillator (VCO) 18, and a divider 19. The VCO 18 sends out a write clock signal that has the same time base fluctuations as that of the horizontal synchronizing signal.

The read clock signal having no time base fluctuation is generated, for example, by an oscillator (OSC) 21 having a fixed oscillation frequency.

Based on the write and read clock signals, memory control circuits 20 and 21, respectively, control readout from and write in to the memory 12.

FIG. 2 represents another example of conventional time base correction apparatus. This example differs from that in FIG. 1 only in the part of write clock signal generation, and therefore only this part is explained below. That is, the oscillator 21 is used also to generate the write clock signal, which is in turn supplied into a phase control circuit 23 together with the horizontal synchronizing signal fed from the synchronizing signal separation circuit 14. The phase control circuit 23 supplies the clock signal fed from the oscillator 21, for example, to a multiple-stage delay circuit of a small delay time and sends out, from the multiple delay circuit, the signal having the nearest phase to that of the horizontal synchronizing signal among its outputs, as a write clock signal. Therefore, the write clock signal has the same time base fluctuations as that of the horizontal synchronous signal.

In the system shown in FIGS. 1 and 2, the time base error of the reproduced video signal is automatically compensated. However the compensation is limited to components of relatively low frequencies, for example, due to the LPF 17 of FIG. 1. When displayed on the monitor screen the image will more fluctuate on the righter side. This error is called a velocity error.

To compensate this velocity error, it is suggested to provide, for example, between the memory control circuit 20 and the phase controller 23 in FIG. 2 with a circuit shown in FIG. 3. In this configuration a clock signal is supplied from the phase control circuit 23 to contact a of a switching circuit 27 and also to phase shifters 31 to 38. The phase shifters 31 to 38 are set in a range of from phase $\pi/2$ to phase $4\pi$ at steps of $\pi/2$. With this, a switching control circuit 26 controls the switching circuit 27, based on the period between horizontal synchronizing signals obtained by a clock generator 24 and a measuring circuit 25, i.e. the frequency of the horizontal synchronizing signal, so that the number of interline write clock pulses of the reproduced video signal can be, for example, 910 by sequentially switching the contacts with contact e as a center.

However, since the write clock signal supplied from the switching circuit 27 performs phase switching in a range of $\pm 2\pi$ with $2\pi$ as a center, in some cases where the components of time base fluctuation of the reproduced video signal to be applied is large, its time base error could not be well compensated.

Moreover, to obtain many phase delays of $\pi/2$ to $4\pi$, a number of phase shifters are required, and in turn involves a problem of complicated control of them.

SUMMARY OF THE INVENTION

An object of the invention is to provide a time base error correction apparatus which is capable of the correction, even a large time axis error occurs in a video signal.

According to the present invention, there is provided an apparatus for compensating a time base error of a video signal, in which an input video signal sampled by a first clock signal corresponding with a time base error of the input video signal is stored in memory means and read out therefrom by a second clock signal with a fixed frequency, comprising signal generation means for generating a master clock signal with a constant frequency; signal outputting means for detecting a difference between a standard and an interval of a synchronizing signal of the input video signal, thus to output a difference signal indicating the difference; control means, responsive to the difference signal, for controlling a phase of an intermediate signal derived from the master clock signal, thus to output the first clock signal; sampling means for sampling the input video signal by the first clock signal; clock generating means for generating the second clock signal derived from the master clock signal.

DETAILED DESCRIPTION OF PREFERRED EMBODIMENTS

Figure 1:
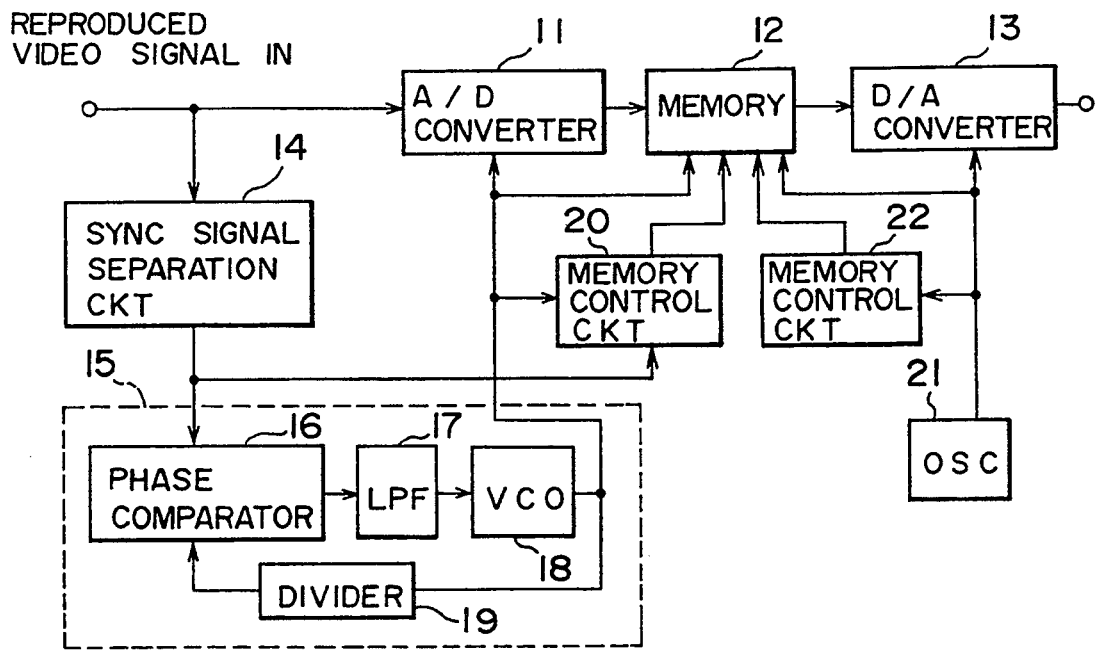
FIG. 1 is a block diagram showing a conventional time base correction apparatus.
Figure 2:
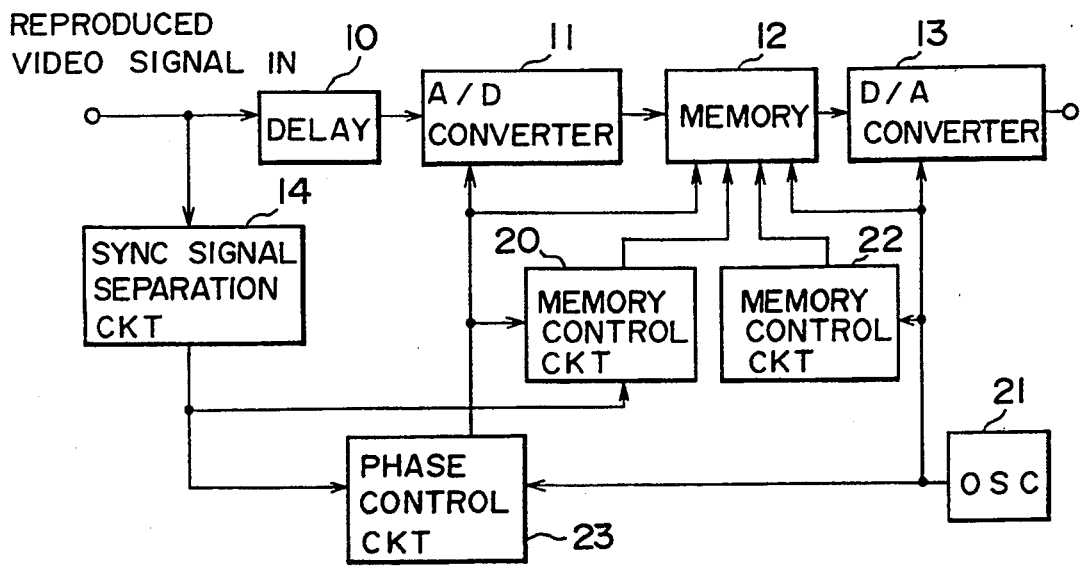
FIG. 2 is a block diagram showing another conventional time base correction apparatus.
Figure 3:
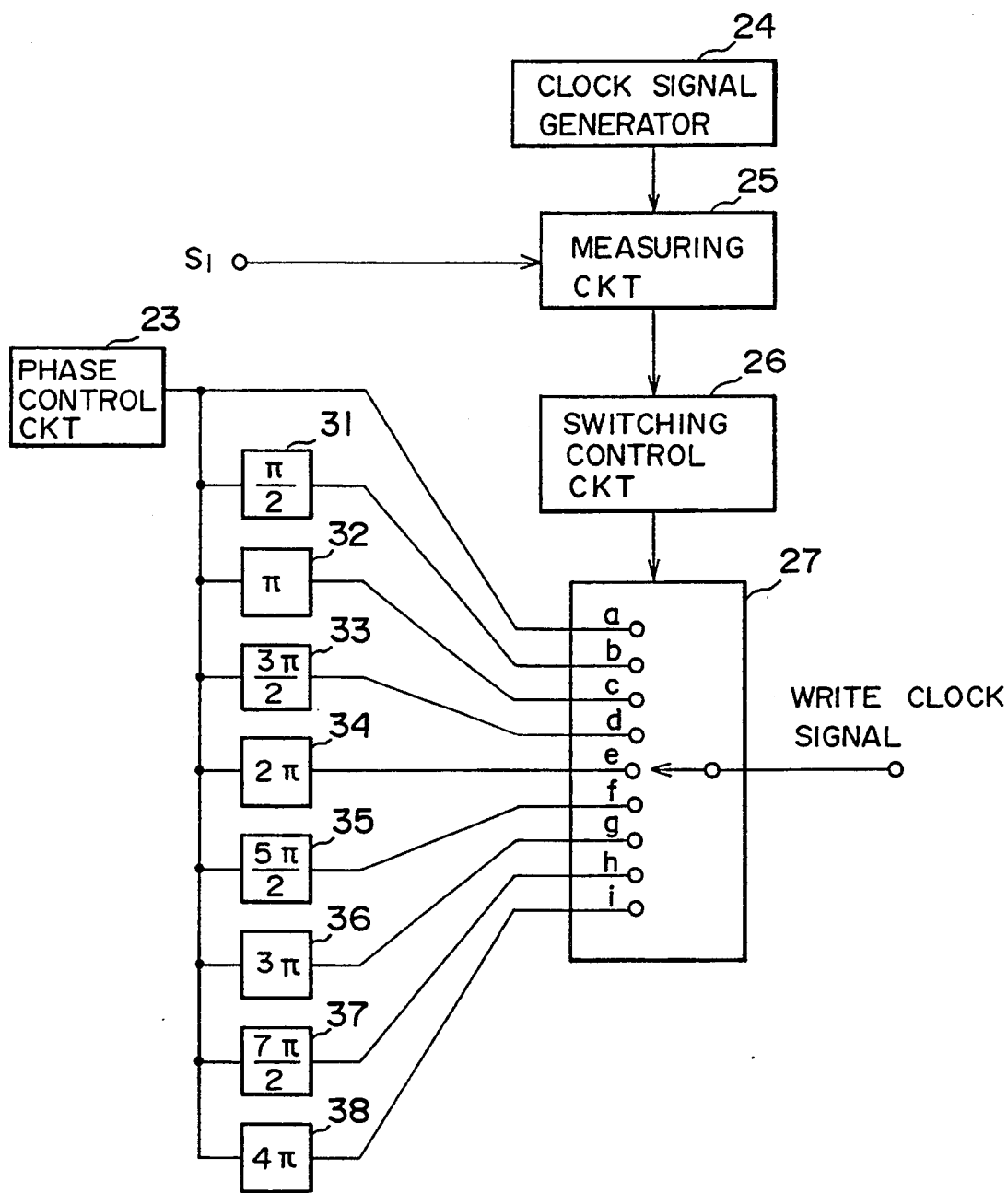
FIG. 3 is a block diagram showing an improved main part of the apparatus shown in FIG. 2.

Embodiments according to this invention will be described with reference to the drawings. In the drawings referred to hereinafter, the same block as that of the abovementioned conventional example is given the same numeral.

Figure 4:
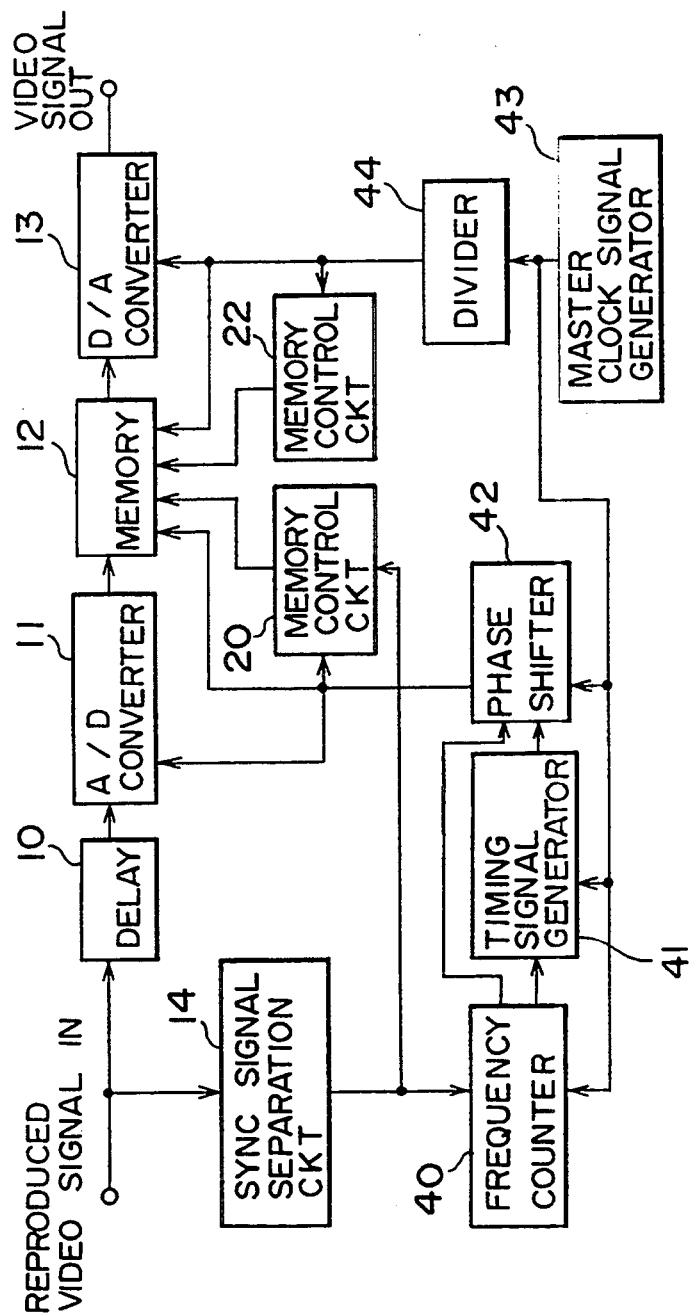
FIG. 4 is a block diagram representative of the first embodiment of a time axis correction apparatus according to this invention.

FIG. 4 is a block diagram representative of the first embodiment of a time base correction apparatus according to this invention. In FIG. 4 a reproduced video signal applied to the apparatus is given a delay time of one horizontal period by a delay circuit 10, supplied to an A/D converter 11, then converted into a digital signal based on a write clock signal described later, and stored in a memory 12. After that, based on a read clock signal having no time base error described later, the digital signal is read out of the memory 12 and then converted into an analog signal by a D/A converter 13 to deliver a video signal whose time base error has been compensated.

A horizontal synchronizing signal separated from the input video signal by a synchronizing signal separation circuit 14 is supplied to a memory control circuit 20 and also to a frequency counter 40. Based on a master clock signal fed from a master clock signal generator 43, the frequency counter 40 measures a frequency of the horizontal synchronizing signal and supplies the result to a timing signal generator 41 and also to a phase shifter 42. Based on the output signal of the timing signal generator 41 and the output signal of the frequency counter 40, the phase shifter 42 generates the abovementioned write clock signal from the master clock signal. The abovementioned read clock is obtained by dividing the master clock signal, delivered from the master clock signal generator 43, by a divider 44. The frequency counter 40 and the timing signal generator 41 configurates means for frequency measurement.

Figure 5:
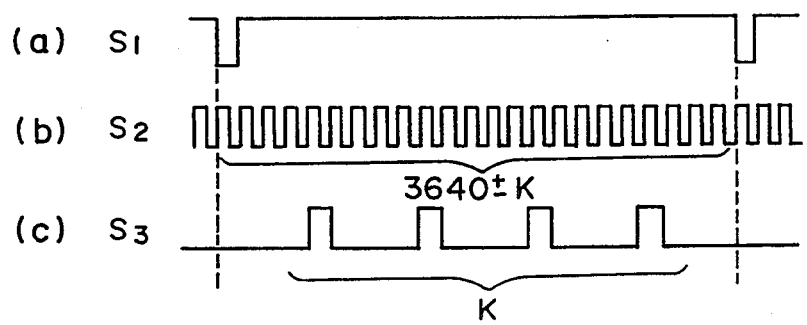
FIG. 5 is an illustration of operation of the abovementioned first embodiment.
Figure 6:
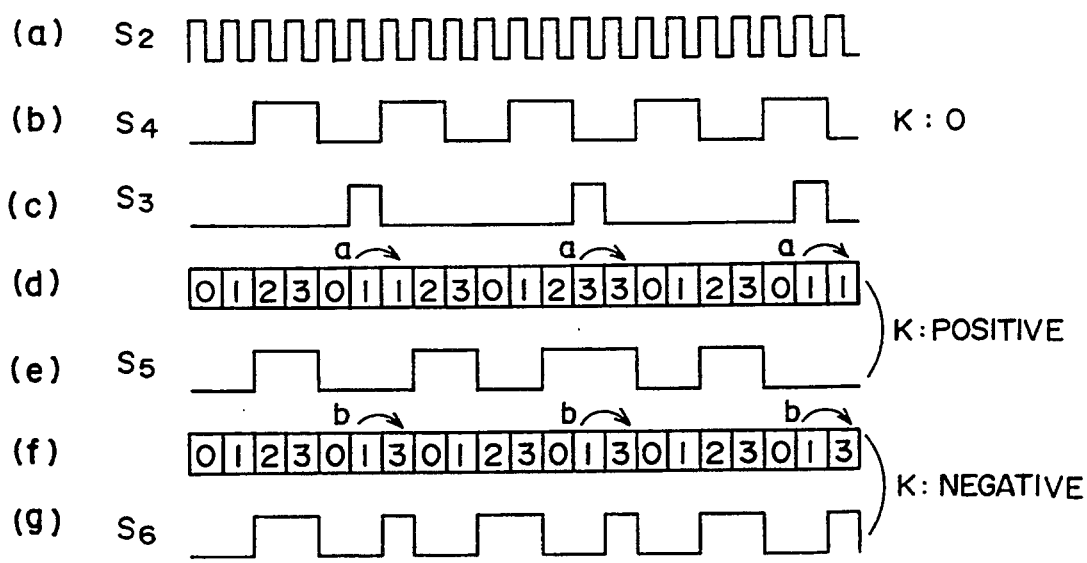
FIG. 6 is an illustration of another operation of the abovementioned first embodiment.

Next, with reference to FIGS. 5 and 6, the operation of the first embodiment shown in FIG. 4 is described. Here, the average frequency of write clock signals and the frequency of the read clock signal are assumed to be $N \cdot Fh$. Fh is a horizontal synchronous frequency when input signals have no time base fluctuation and N a positive integer. Also, the frequency of the master clock signal generated by the master clock signal generator 43 is supposed to be $M \cdot N \cdot Fh$. M is a positive integer. In the following description, M and N are assumed to be 4 and 910 respectively. These values are well used for designing a time base correction apparatus for video signals of NTSC system.

The frequency counter 40 counts the number of pulses of a master clock signal S2 shown in FIG. 5(b) existing within a term between one falling edge and the next one of a horizontal synchronizing signal S1 shown in FIG. 5(a), and supplies a difference between the count and $M \cdot N = 3640$. When the input video signal has no time base fluctuation, the count value is 3640, so that the output value of the frequency counter 40 is zero. If the input video signal has some time base fluctuations and one scanning period is shorter than that of a normal period (i.e., the frequency of the horizontal synchronizing signal has increased), the count value becomes smaller than 3640. While if longer, (i.e., the frequency of the horizontal synchronizing signal has decreased), the count value becomes greater than 3640. In this case, a count difference K of this count value from 3640 is supplied to the timing signal generator 41. The count difference K supplied to the timing signal generator 41 actually indicates the absolute number of K. A signal that indicates the sign of K is supplied from the frequency counter 40 to phase shifter 42.

Based on the count difference K (absolute number), the timing signal generator 41 generates a timing pulse signal S3 shown in FIG. 5(c) whose K number of pulses appear approximately at the same intervals of time within a period next to the period where frequency has been measured. Therefore, the timing pulse signal S3 and the signal representative of the polarity of the count difference K from the count of the frequency counter 40 are the signals that correspond to the fluctuation of the horizontal synchronous frequency, i.e. a time base error, of the input video signal.

The phase shifter 42 divides the master clock signal frequency shown again in FIG. 6(a) into $1/M$ ($\frac{1}{4}$), and sends out a write clock signal S4 having a frequency of $N \cdot Fh$ (910 Fh) as shown in FIG. 6(b), so that the phase shifts by one clock of the master clock signal S2 for each timing at which the timing pulse signal S3 shown in FIG. 6(c) is applied. Since one clock of the master clock signal S2 corresponds to $\pi/2$ of the phase of the write clock signal S4, a quarter of the master clock signal frequency, the phase of the write clock signal S4 shifts, after all, by $\pi/2$ every time the timing pulse S3 is applied. The shift direction depends on the signal representative of the polarity of a count difference K delivered from the frequency counter. That is, if the count difference K is positive, the phase to divide the frequency is, as indicated by arrows a in FIG. 6(d), delayed by one clock of the master clock signal, and a write clock signal S5 shown in FIG. 6(e) is provided. If the count difference K is negative, the phase to divide the frequency is, as indicated by arrows b in FIG. 6(f), advanced by one clock of the master clock signal, and a write clock signal S6 shown in FIG. 6(g) is provided. The numerals appeared in blocks shown in FIGS. 6(d) and 6(f) indicate the count numbers of the master clock signal S2.

In such a way, every time the timing pulse signal S3 is provided, the phase of the write clock signal S4 is shifted by $\pi/2$ as the write clock signal S5 or S6 in response to the polarity of the count difference K and finally the number of write clock pulses for each scanning period is always $M \cdot N = 910$ and follows up the time base fluctuations of the input video signal. In FIG. 4, therefore, at every scanning period, the video signal is always sampled 910 times in the A/D converter 11, and then written into the memory 12, where the sampling results are stored with the time base fluctuations removed. Those results are read out of the memory 12 by a stable read clock signal delivered from the divider 44, thus obtaining a video signal free of time base fluctuations.

Consider a case where in the abovementioned configuration, for example, the scanning period is longer than that of normal one by 10 clock pulses of the master clock signal S2. The timing pulse signal S3 is generated at a rate of 10 pulses between approximately uniform intervals within one scanning period. Here, the polarity of the count difference is positive, so that the phase shifter 42 delays the phase of the pulse as in the write clock signal S5, every time the timing pulse signal S3 is applied. After all, the phase of the write clock signal S5 is delayed in phase by $(\pi/2) \times 10 = 5\pi$ at the end of one scanning period. Oppositely, when the one scanning period is shorter than the normal by ten clock pulses of the master clock signal S2, the phase of the write clock signal S6 is advanced by $(\pi/2) \times 10 = 5\pi$ at the end of one scanning period.

The abovementioned phase shift of $\pi/2$ is that in the case where M is 4. In general the phase may be shifted by $2\pi/M$ every time.

Figure 7:
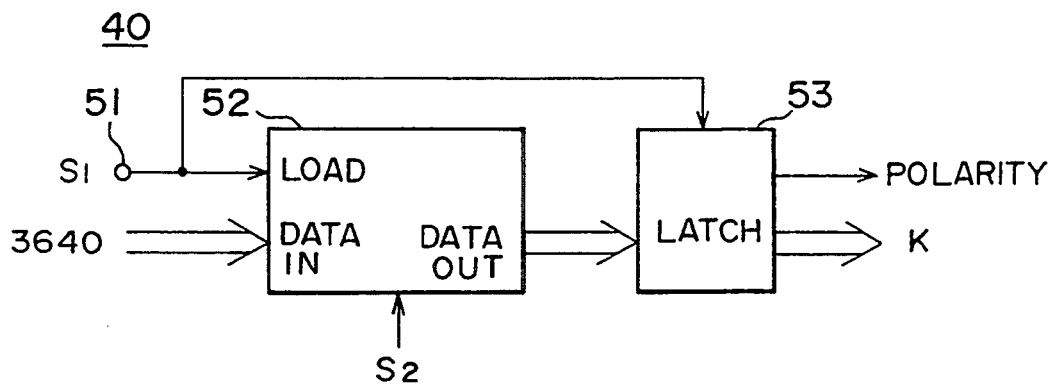
FIG. 7 is a block diagram showing an embodiment of the frequency counter of the abovementioned first embodiment.

Next, an actual configuration of the frequency counter 40 is explained with reference to FIG. 7. To a terminal 51 the horizontal synchronizing signal is applied from the synchronizing signal separation circuit 14 in FIG. 4, and to both a load input terminal of a down counter 52 and a clock input terminal of a latch 53. Also, at a data input terminal of the down counter 52 a value "3640" is entered, while to the clock input terminal the master clock signal S2 is applied. When a horizontal synchronizing signal is applied to the load input terminal, the down counter 52 loads "3640" which has been given to a data input, and performs count-down in response to the input of the master clock signal S2, thus providing the count for the output. When the next synchronizing signal arrives, the latch 53 latches the count value and sends out the count difference K at the output terminal with a negative polarity when one scanning period is shorter than the normal and the count value does not reach zero or with a positive polarity when one scanning period is longer than the normal and the count value has passed zero.

Figure 8:
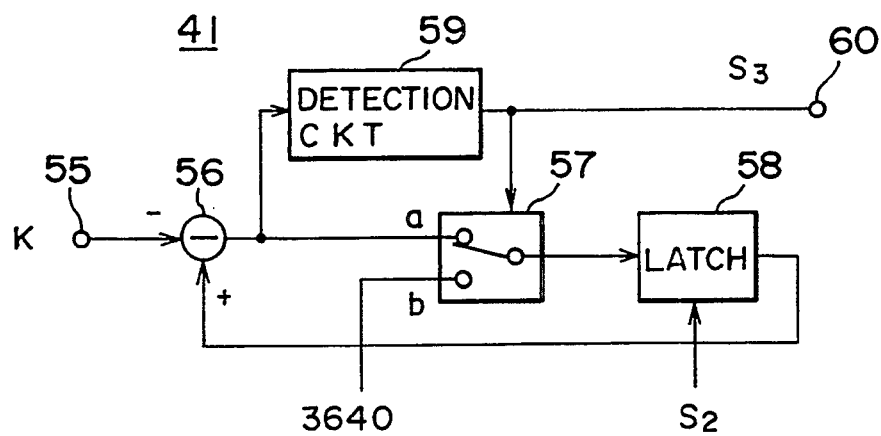
FIG. 8 is a block diagram showing an embodiment of the timing signal generating circuit of the abovementioned first embodiment.

An actual configuration of the timing signal generator 41 is described with reference to FIG. 8. This timing signal generator 41 constitutes a dividing circuit. To terminal 55, the count difference K is supplied from the latch 53 shown in FIG. 7. The value "K" is supplied to one input terminal of a subtracter 56 and subtracted from an output value of a latch circuit 58. The output is then supplied to a detection circuit 59 and a terminal a of a switch 57. To the terminal b of the switch 57 the value "3640" is applied. Also, the output of the switch 57 is supplied to the data input terminal of the latch 58. To a clock input terminal of the latch 58 the master clock signal S2 is supplied. The output of the latch 58 is connected to another input terminal of the subtracter 56. Also, the detector 59 supplies the timing pulse signal S3 to a terminal 60 and, at the same time, controls the switch 57 so as to switch from the terminal a to the terminal b, loading the value "3640" to the latch 58.

The abovementioned configuration permits the timing signal generator 41 to subtract the count difference K from an output value of the latch 58 and then loads the result in latch 58. Then, this resultant value is supplied to the other input of the subtracter 56 again. This operation is repeated at the period of master clock signal to subtract the count difference K sequentially. In this process when the detector 59 detects a negative value of the output of the subtracter 56, the value "3640" is loaded through the switch 57 into the latch 58, thus repeating the subtraction. Therefore, from the detector 59, one pulse is obtained every "3640/K" pulses of master clock, so that the timing pulse S3 having approximately the same pulse intervals within one scanning period can be obtained.

Figure 9:
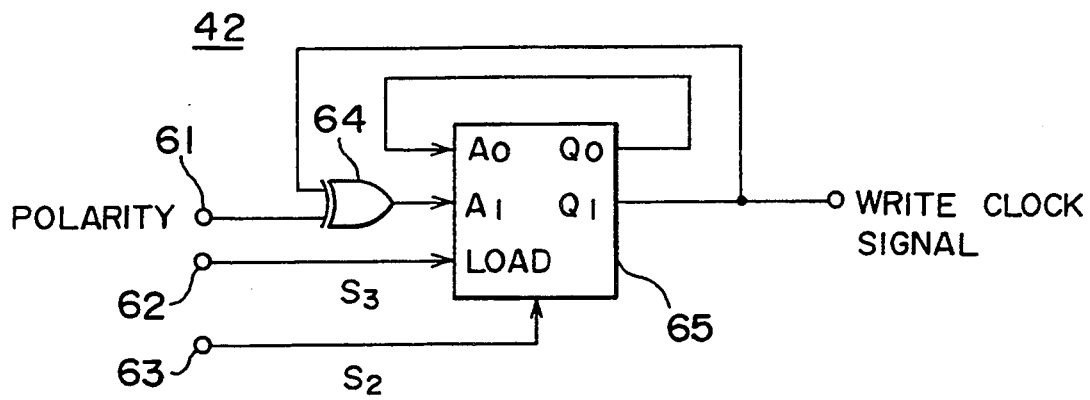
FIG. 9 is a block diagram showing an embodiment of the phase shifter of the abovementioned first embodiment.

An actual configuration of the phase shifter 42 is described below with reference to FIG. 9. A terminal 61 is supplied with the signal representative of the polarity of the count difference K, a terminal 62 with the timing pulse signal S3, a terminal 63 with the master clock signal S2, respectively. The timing pulse signal S3 and master clock signal S2 are supplied to the load input and clock input terminals of a binary counter 65, respectively. In the binary counter 65, an output terminal Q1 sends out, as the second-bit output, a write clock signal whose frequency has been divided into ¼ of the master clock signal S2. Furthermore, the first-bit output Q0 is supplied to a data input terminal A0, and the second-bit output Q1 is supplied through an exclusive OR circuit 64 to a data input terminal A1, respectively. When supplied with the timing pulse signal S3 and also with the master clock signal S2, the binary count 65 loads to the data load output terminals the values supplied to the data input terminals A0 and A1. The other input terminal of the exclusive OR circuit 64 is supplied with a signal representative of the polarity of the count difference K.

When the signal representative of the polarity of the count difference K is in the low level, i.e., when the period of the horizontal synchronizing signal of the input video signal is longer than the normal, the data input A1 of the binary counter 65 is the same as the data output Q1. Therefore, when the timing pulse signal S3 is applied to the LOAD terminal of the binary counter 65, the values of output at data output terminals Q0 and Q1 are loaded in the binary counter 65 and again sent out in response to input of the subsequent master clock signal S2. As a result the phase of the write clock signal sent out of the data output terminal Q1 is delayed by one clock of the master clock signal S2, i.e., $\pi/2$.

On the other hand, when the signal representative of the polarity of the count difference K is in the High level, i.e., when the period of the horizontal synchronizing signal of the input video signal is shorter than the normal, the polarity of the data input A1 of the binary counter 65 becomes opposite to that of the data output Q1. Therefore, when the timing pulse signal S3 is applied to the LOAD terminal of the binary counter 65, the value which is two larger than the values of data output Q0 and Q1 is sent out when the subsequent master clock signal S2 is entered. For instance, when the values of data outputs, Q0 and Q1, of the down counter 65 are "0", "1", "2", and "3", input data "2", "3", "0", and "1" are sent out, as output data, at data output terminals, Q0 and Q1. In normal cases, where the timing pulse signal S3 is not applied, the value which is one larger than the preceding data outputs is sent out. As mentioned above, sending out the value which is two larger than the preceding data outputs, with response to the master clock signal means that the phase of the write clock signal sent out of the data output terminals Q1 in response to the timing pulse signal S3 is advanced by one clock pulse of the master clock signal, i.e., $\pi/2$. As described above, while dividing the frequency of the master clock signal S2 to ¼, the phase shifter 42 shown in FIG. 9 generates the write clock signals, S4, S5, and S6, that have their frequencies of N times the horizontal synchronous frequency.

In the next place, the second preferred embodiment of the present invention is described with reference to FIG. 10. In the first embodiment the phase of the write clock signal is shifted while the frequency of the master clock signal S2 is being divided. In the second embodiment, a clock signal of the phase nearest to that of the horizontal synchronizing signal is selected, as a write clock signal for the output, from a plurality of clock signals that have the frequency of N·Fh in different phases as in the case of the phase control circuit described in connection with the conventional ones, and the phase of the write clock signal is shifted by selecting a clock signal, as above, from a plurality of clock signals in response to the output of means for frequency measurement.

Figure 10:
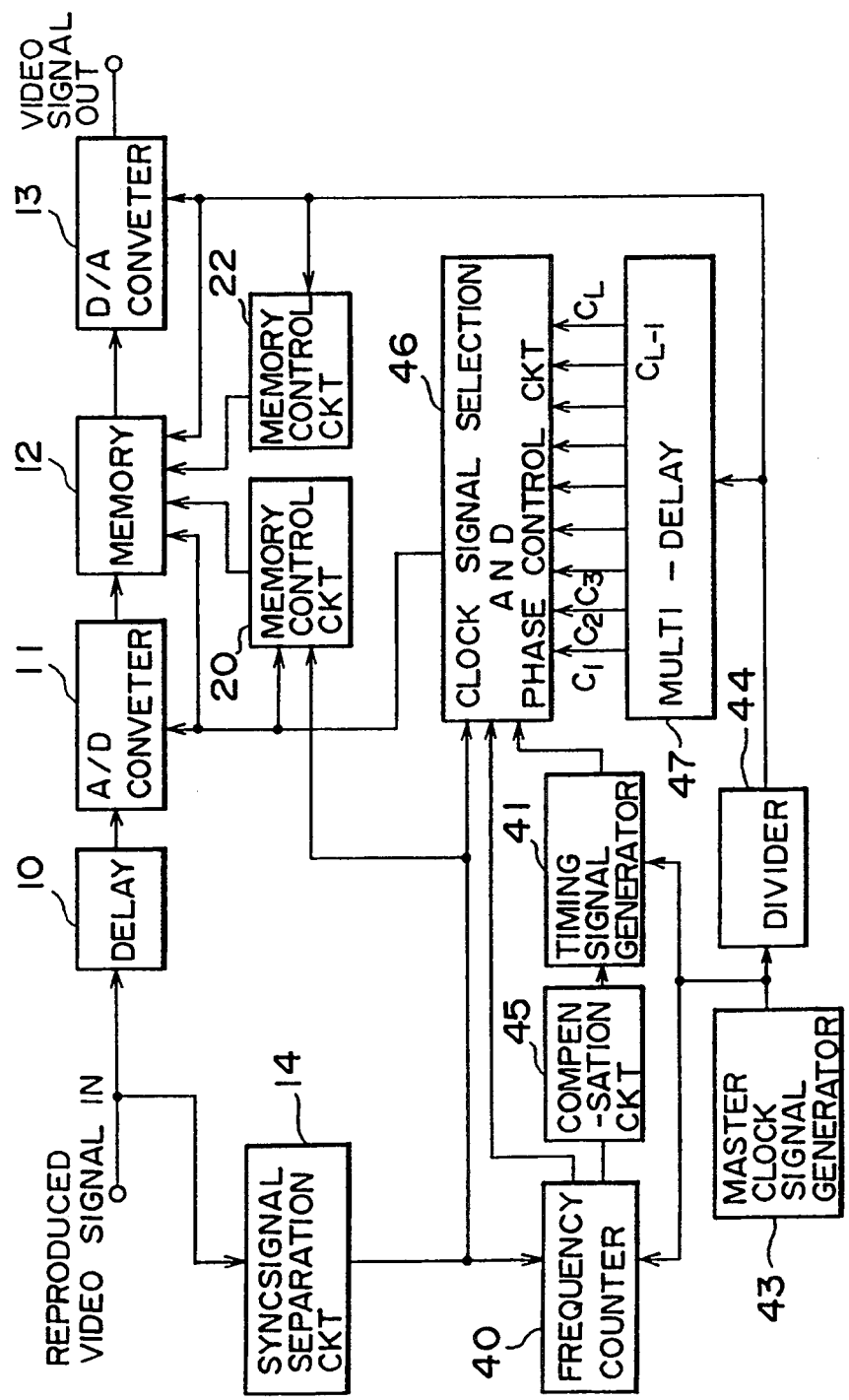
FIG. 10 is a block diagram showing the second embodiment of a time base correction apparatus according to this invention.

In FIG. 10 the signal delivered from a divider 44 with frequency of N·Fh is applied, as a read clock signal, to a memory control circuit 22 and a memory 12, as well as to a multi-delay circuit 47. The multi-delay circuit 47 has a plurality of delayed outputs into which the time equivalent to one period of the supplied clock signal is approximately equally divided. The clock signals delivered as a plurality of the outputs are supplied to a clock signal selection and phase control circuit 46. Its output is supplied, as the write clock signal, to the memory control circuit 22 and memory 12. A compensation circuit 45 compensates, as described later, the count difference K from a frequency counter 40, and supplies the compensated count difference to a timing signal generator circuit 41. A frequency counter 40, the timing signal generator 41 and the compensation circuit 45 constitute means for frequency measurement.

Figure 11:
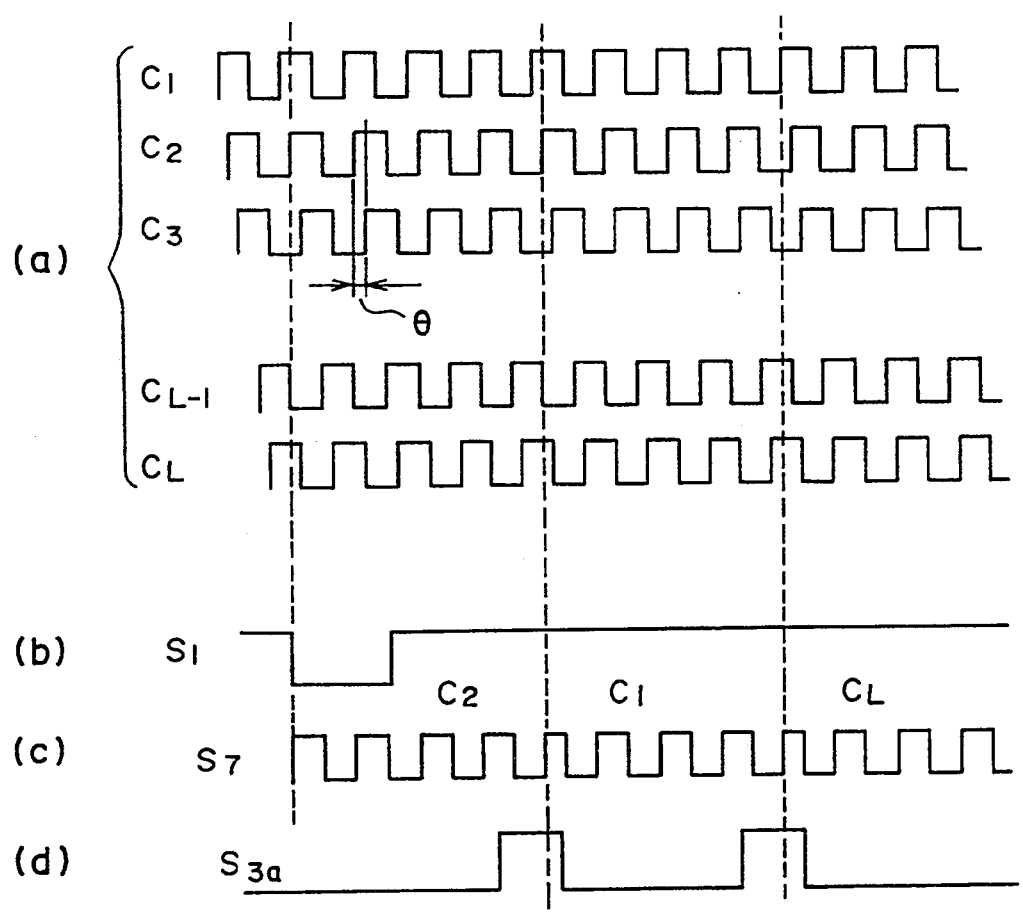
FIG. 11 is an illustration of operation of the abovementioned second embodiment.

The operation of main parts of the system illustrated in FIG. 10 is described below with reference to FIG. 11. Assuming the number of a plurality of outputs from the multi-delay circuit 47 to be L, these outputs comprise L number of clock signals, C1, C2, ... CL with phase shifted by $\theta = 2\pi/L$. The clock signal selection and phase control circuit 46 selects from these clock signals, C1, C2, ... CL, a signal of the phase nearest to that of the horizontal synchronizing signal supplied from a synchronizing signal separation circuit 14 for output as a write clock signal S7 shown in FIG. 11(c). This operation is the same as that of the phase control circuit described in connection with the conventional one. Every time a timing pulse signal S3a shown in FIG. 11(d) is supplied from the timing pulse signal generator 41, the clock signal selection and phase control circuit 46 shifts the successively selected clock signals stepwise in response to the polarity of the count difference K. Here assume the phase of clock signals C1, C2, C3, ... CL to be 0, $\theta$, $2\theta$, ... $(L-1)$. When, for example, the clock signal C2 of the phase nearest to the horizontal synchronizing signal is sent out of the clock signal selection and phase control circuit 46, the clock signals are shifted in the order of C2→C1→CL→CL−1, every time the timing pulse S3a is applied, if the measured horizontal period is shorter than normal, or in the order of CL−1→CL→C1→C2→C3, ... if the measured horizontal period is longer than normal. The timing pulse signal S3a is generated as described below: The measurement unit for measuring the horizontal synchronizing frequency, i.e. horizontal period, of the input video signal is $2\pi/M$ since the measurements are conducted using the master clock signals having a frequency of M·N·Fh generated by the master clock signal generator 43. On the other hand, the phase difference $\theta$ of the clock signals sent out of the multi-delay circuit 47 is $2\pi/L$ as described above, and it is therefore impossible to shift the phase by use of the timing pulse signal S3, shown in the first preferred embodiment. For this reason, in the compensation circuit 45, the count difference K sent from the frequency counter 40 is multiplied by L/M and supplied to a timing signal generator 41, where the timing pulse signal S3 of $(L/M) \times K$ pulses per scanning period is generated. In such a way the timing pulse signal S3 corresponding to $\theta$ is generated.

In the second preferred embodiment illustrated in FIG. 10, the frequency of the master clock signal S2 for measuring the frequency of the horizontal synchronizing signal is M·N·Fh, whereas the frequency of the clock signal supplied to the multi-delay circuit 47 is N·Fh. Therefore both signals differ in frequency. These signals may have the same frequency. For example, in place of the master clock signal generator 43 and divider 44, an oscillator that generates a clock signal of frequency N·Fh may be provided, so that the clock signal can be used for measuring the frequency of the horizontal synchronizing signal and as input to the multi-delay circuit 47 and a read clock signal. In this case the compensation circuit 45 supplies to the timing signal generator 41 the numeric value obtained by multiplying the count difference K, delivered from the frequency counter 40, by L. As a result, the timing signal generator 41 generates a timing pulse signal having L×K pulses per scanning period. As described above, the timing pulse signal responsive to the phase difference $\theta$ of the output from the multi-delay circuit 47 can be supplied to the clock signal selection and phase control circuit 46 to obtain the successively phase-shifted write clock signal S7.

As described above with preferred embodiments, the time base correction apparatus of the present invention shifts successively the phase of the write clock signal in a scanning period in response to the horizontal synchronizing frequency of the input video signal, stores in a memory the video signal digitalized in such a way that the number of the write clock signals per scanning period can be always constant, and reads out the stored video signal by the read clock signal of a given frequency, thus enabling time base error compensation, in case of large time base error of the input video signal, with the effect that the images are not subject to expansion and contraction when displayed on a monitor.

What is claimed is:

1. An apparatus for compensating for a time base error of a video signal, in which an input video signal sampled by a first clock signal corresponding with a time base error of the input video signal is stored in memory means and read out therefrom by a second clock signal having a fixed frequency, the apparatus comprising:

signal generation means for generating a master clock signal having a constant frequency;

signal output means for detecting a difference between a standard and an interval of a synchronizing signal of the input video signal of the basis of the master clock signal, to output a difference signal indicating the difference;

control means responsive to the difference signal for controlling a phase of an intermediate signal on the basis of the master clock signal, thus to output the first clock signal;

sampling means for sampling the input video signal by the first clock signal; and clock generating means for generating the second clock signal derived from the master clock signal;

wherein, the signal output means comprises:

a counter for down-counting from a predetermined number by the master clock signal in the interval of the synchronizing signal included in the input video signal, to output a pulse signal according to a difference between a counted number of the master clock signal and the predetermined number; and a comparator for comparing the predetermined number and the number of the master clock signal counted during the interval of the synchronizing signal, to output a positive signal when the predetermined number is smaller than the counted number, and to output a negative signal when the predetermined number is larger than the counted number.

2. An apparatus according to claim 1, wherein the control means comprises:

a first divider for dividing the master clock signal by the difference between the counted number and the predetermined number to output a pulse signal containing pulses of a number equal to the difference and having an interval set on the basis of the division result;

a second divider for dividing the master clock signal by a predetermined integer to generate the intermediate signal; and a phase shifter responsive to the positive signal for delaying phase by a specific period of the intermediate signal at every occurrence of the pulse signal, and responsive to the negative signal for advancing the phase of the intermediate signal by the specific period at every occurrence of the pulse signal to output the first clock signal.

3. An apparatus for compensating for a time base error of a video signal, in which an input video signal sampled by a first clock signal corresponding with a time base error of the input video signal is stored in memory means and read out therefrom by a second clock signal having a fixed frequency, comprising:

signal generation means for generating a master clock signal having a constant frequency;

signal output means for detecting a difference between a standard and an interval of a synchronizing signal of the input video signal of the basis of the master clock signal, to output a difference signal indicating the difference, said signal output means comprising:

a counter for down-counting from a predetermined number by the master clock signal in the interval of the synchronizing signal included in the input video signal, to output a pulse signal according to a difference between a counted number of the master clock signal and the predetermined number; and a comparator for comparing the predetermined number and the number of the master clock signal counted during the interval of the synchronizing signal, to output a positive signal when the predetermined number is smaller than the counted number, and to output a negative signal when the predetermined number is larger than the counted number;

control means responsive to the difference signal for controlling a phase of an intermediate signal on the basis of the master clock signal, thus to output the first clock signal;

sampling means for sampling the input video signal by the first clock signal;

clock generating means for generating the second clock signal derived from the master clock signal;

the control means comprises second signal generation means for generating the intermediate signal containing a specific number of pulse trains obtained from frequency division of the master clock signal and having the same phase difference;

selection means for selecting a pulse train from the intermediate signal having a phase closest to a phase of the synchronizing signal included in the input video signal, and responsive to the positive or negative signal and a pulse of the pulse signal for changing the selected pulse train from the intermediate signal, to output the first clock signal.

* * * * *